H. O. CLARK.
VEHICLE TIRE.
APPLICATION FILED AUG. 21, 1908.

954,255.

Patented Apr. 5, 1910.

Witnesses

Inventor
Horace O. Clark
By C. A. Snow & Co.
Attorneys

UNITED STATES PATENT OFFICE.

HORACE O. CLARK, OF NEW YORK, N. Y.

VEHICLE-TIRE.

954,255.

Specification of Letters Patent.　　Patented Apr. 5, 1910.

Application filed August 21, 1908. Serial No. 449,690.

*To all whom it may concern:*

Be it known that I, HORACE O. CLARK, a citizen of the United States, residing at New York, in the county of New York and State of New York, have invented a new and useful Vehicle-Tire, of which the following is a specification.

This invention relates to vehicle tires and its object is to provide a sectional tire of yieldable material, said sections being designed to be fastened to the rim in a simple and efficient manner.

A further object of the invention is to provide a tire which is so constructed as to increase the tractive force of the wheel and at the same time prevent side skidding.

Another object is to provide a tire made up of spaced sections so positioned as to avoid the production of vibrations when the wheel is traveling over a smooth surface.

A still further object is to provide novel means for attaching the tire sections to a wheel rim.

With these and other objects in view the invention consists of certain novel features of construction and combinations of parts which will be hereinafter more fully described and pointed out in the claims.

In the accompanying drawings is shown the preferred form of the invention.

Figure 1:
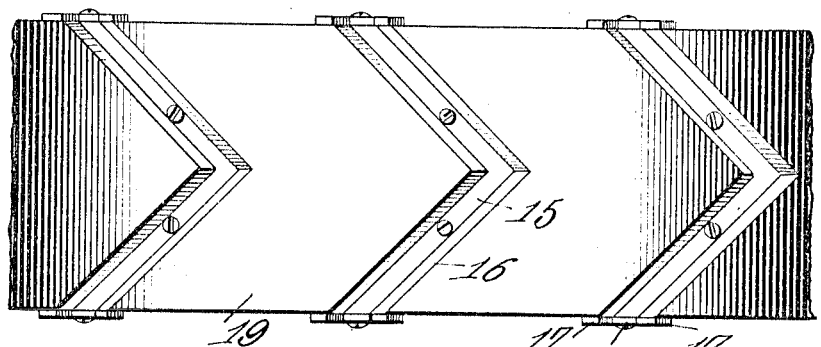
Figure 2:
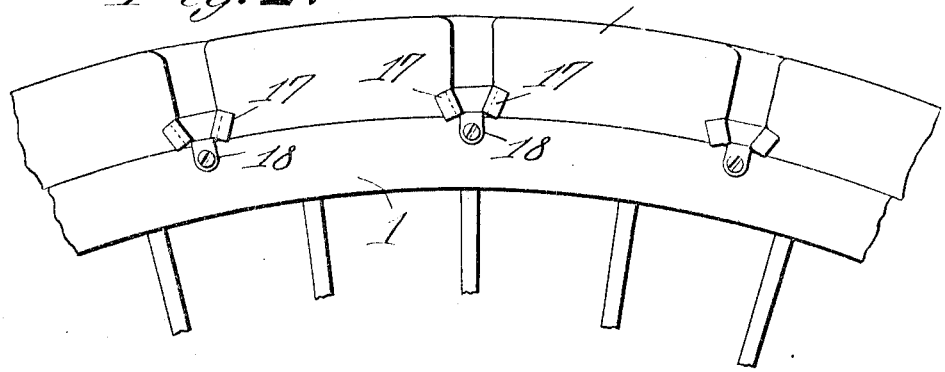
Figure 3:
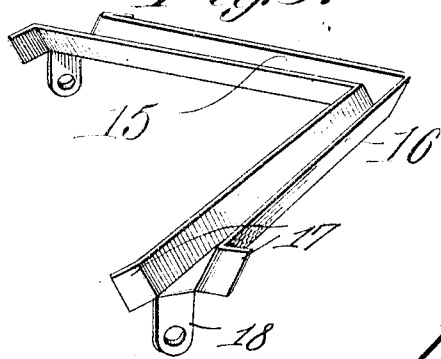
Figure 4:
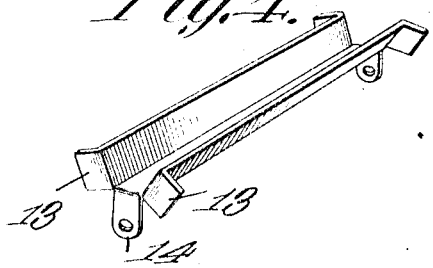

In said drawings; Figure 1 is a plan view of a portion of a tire embodying the present improvements. Fig. 2 is a side elevation thereof, a portion of the wheel being shown. Fig. 3 is a detail view of one of the retaining strips. Fig. 4 is a detail view of a modified form of retaining strip.

Referring to the figures by characters of reference, 1 designates the rim or felly of a wheel on which is mounted a tire embodying the present improvements. This tire consists of a series of V-shaped retaining strips 15, each of which has longitudinally extending outwardly diverging flanges 16. Ears 17 and 18 are formed at the free ends of each strip, the ears 18 being designed to be fastened to the sides of the wheel rim, while the ears 17 are designed to lap the ends of cushioning blocks 19 which are interposed between the strips 15. These blocks are preferably formed of rubber or other flexible material and are shaped so as to fit snugly between the retaining strips, the flanges 16 lapping the adjoining edge portions of the blocks, and thus holding said blocks against displacement.

Instead of utilizing V-shaped retaining strips, a straight retaining strip may be provided. One of these strips has been shown in Fig. 4, the same being provided at each end with ears 13 and 14 corresponding with the ears 17 and 18 and utilized for the same purpose. When straight retaining strips are employed, the cushioning blocks must, of course, be correspondingly shaped.

What is claimed is:

1. The combination with a wheel rim, of a tire comprising a series of angularly disposed blocks extending throughout the width of the rim, and retaining devices interposed between the blocks, each of said devices constituting a strip of sheet metal having longitudinal flanges disposed at inclines to the body portions of the strips and lapping the adjoining blocks, retaining ears at the ends of the flanges and lapping the ends of the adjoining blocks, ears extending perpendicularly from the ends of the strips, and lapping the rim, and means engaging the last mentioned ears and rim for holding the strips upon the rim.

2. In a vehicle tire a cushion block retaining device consisting of an angular strip of sheet metal having longitudinal side flanges, said flanges being inclined and converging toward the strip, oppositely extending ears at each end of the strip, said ears constituting cushion block retaining portions, and an ear at each end of the strip for the reception of securing means, all of said ears and the strips being struck from a single piece of metal.

In testimony that I claim the foregoing as my own, I have hereto affixed my signature in the presence of two witnesses.

HORACE O. CLARK.

Witnesses:
　JNO. E. PARKER,
　W. J. DILLON.